United States Patent [19]
McCurley et al.

[11] Patent Number: 5,982,170
[45] Date of Patent: Nov. 9, 1999

[54] ROTARY POSITION SENSOR WITH IMPROVED BEARING TOLERANCE

[75] Inventors: Jeffrey L. McCurley, Elkhart; Robert J. Campbell, Granger; James E. White, Warsaw; Scott L. Spence, Elkhart, all of Ind.

[73] Assignee: CTS Corporation, Elkhart, Ind.

[ * ] Notice: This patent is subject to a terminal disclaimer.

[21] Appl. No.: 08/976,879

[22] Filed: Nov. 24, 1997

Related U.S. Application Data

[62] Division of application No. 08/206,474, Mar. 4, 1994, Pat. No. 5,798,639.

[51] Int. Cl.⁶ .............................. G01B 7/30; G01D 5/14; F02P 7/07
[52] U.S. Cl. .................. 324/207.2; 324/207.22; 324/207.25
[58] Field of Search .................... 324/173, 174, 324/207.2, 207.21–207.25, 251, 252; 123/146.5 A, 617, 406.52, 406.58; 310/68 B; 73/514.31

[56] References Cited

U.S. PATENT DOCUMENTS

| | | |
|---|---|---|
| 3,112,464 | 11/1963 | Ratajski et al. |
| 3,742,243 | 6/1973 | Gamble ........................ 324/174 X |
| 4,392,375 | 7/1983 | Eguchi et al. ............... 324/207.21 X |
| 4,570,118 | 2/1986 | Tomczak et al. ............... 324/251 X |
| 4,703,261 | 10/1987 | Berchtold ...................... 324/207.2 |
| 5,159,268 | 10/1992 | Wu ................................ 324/207.2 |
| 5,164,668 | 11/1992 | Alfors ........................... 324/207.2 |
| 5,191,284 | 3/1993 | Moretti et al. ................. 324/174 |
| 5,270,645 | 12/1993 | Wheeler et al. ............... 324/207.2 X |
| 5,798,639 | 8/1998 | McCurley et al. ............. 324/207.2 |

FOREIGN PATENT DOCUMENTS 2229006  12/1990  United Kingdom ............. 324/207.2

*Primary Examiner*—Gerard Strecker
*Attorney, Agent, or Firm*—Mark P. Bourgeois

[57] ABSTRACT

An angular sensor has a shaped dual magnet structure carried upon a pole piece having a generally "c" shaped cross-section. The magnet and pole piece define a generally circular linear field which is concentric about the axis of rotation of the complete rotor. A Hall effect device is inserted into the open portion or gap between the two magnets and is exposed to a well defined field. Through the use of particular magnet materials and a magnet geometry extending from the axis of rotation to a point well beyond the Hall sensor, a precise and yet tolerant magnetic circuit is produced.

19 Claims, 4 Drawing Sheets

ROTARY POSITION SENSOR WITH IMPROVED BEARING TOLERANCE

This application is a division of application Ser. No. 08/206,474, filed Mar. 4, 1994, now U.S. Pat. No. 5,798,639, pending.

BACKGROUND OF THE INVENTION

1. Field of the Invention

This invention pertains generally to position sensing, and specifically to rotary or angular position sensors which are both durable and precise for application to rugged and demanding environments.

2. Description of the Related Art

There are a variety of known techniques for angular position sensing. Optical, electrical, electrostatic and magnetic fields are all used with apparatus to measure position.

There are many known apparatus for using these energies for sensing. A few of the known apparatus are resistive contacting sensors, inductively coupled ratio detectors, variable reluctance devices, capacitively coupled ratio detectors, optical detectors using the Faraday effect, photo-activated ratio detectors, radio wave directional comparators, and electrostatic ratio detectors. There are many other known detectors, too numerous to mention herein.

These detection methods tend to each offer much value for one or more applications, but none meet all application requirements for all position sensing applications. The limitations may be due to cost, sensitivity to particular energies and fields, resistance to contamination and environment, stability, ruggedness, linearity, precision, or other similar factors.

Transportation applications generally, and specifically automotive applications, are very demanding. Temperatures may rise to 150 degrees Centigrade or more, with road contaminants such as salt and dirt splashing upon the engine compartment. This may occur while the engine is still extremely hot from operation. At the other extreme, an engine is expected to perform in the most northern climates without fault, and without special preheating.

Present throttle position sensors are manufactured using a resistive sensor combined with a sliding contactor structure. The sliding contact serves to "tap" the resistor element and provide a voltage proportional to position. The resistive sensor has proven to offer the greatest performance for cost in throttle position sensing applications, unmatched by any other technology to date. However, the resistive throttle position sensors are not without limitation.

An automotive position sensor must endure many millions or even billions of small motions referred to in the industry as dithers. These dithers are the result of mechanical motion and vibration carried into the position sensor. Additionally, during the life of a throttle position sensor, there may be a million or more full stroke cycles of motion. In resistive sensors, these motions can affect signal quality.

In spite of this shortcoming, throttle position sensors are resistive sensors. Over the years, efforts at improving the contactor-element interface have vastly improved the performance of these devices. Similar improvements in packaging and production have maintained cost advantage. A replacement component must be able to meet throttle position sensor performance requirements while offering similar price advantage.

The combination of temperature extremes and contamination to which an automotive sensor is exposed causes the industry to explore very rugged and durable components. One particular group of sensors, those which utilize magnetic energy, are rapidly being accepted into these demanding applications. This is because of the inherent insensitivity of the magnetic system to contamination, together with durability characteristic of the components.

Applying magnetic sensing to tone wheels for applications such as anti-lock braking and ignition timing has been a relatively easy task. The impulse provided by the tone wheel is readily detected through all conditions, with very simple electronic circuitry.

Magnetic position sensors, particularly those using Hall effect IC detectors, are also being pursued. Many in the industry believe these sensors will ultimately offer advantages over the present resistive technology. However, prior to the present invention, none of these sensors were able to offer the necessary combination of low cost, reliability, and precision output.

Magnetic circuits offer admirable performance upon exposure to the usual moisture and dirt contaminants. However, linearity and tight tolerances are another issue. Sensors are subjected to both radial and axial forces that change the alignment of the rotor portion of the sensor with respect to the stationary portion (stator). Somewhere in the system is at least one bearing, and this bearing will have a finite amount of play, or motion. That play results in the rotor moving relative to the stator.

Unfortunately, magnetic circuits of the prior art tend to be very sensitive to mechanical motion between the rotor and stator. As noted, this motion may be in an axial direction parallel to the axis of rotation, or may be in a radial direction perpendicular to the axis, or a combination thereof.

Typical magnetic circuits use one or a combination of magnets to generate a field across an air gap. The magnetic field sensor, be this a Hall effect device or a magnetoresistive material or some other magnetic field sensor, is then inserted into the gap. The sensor is aligned centrally within the cross-section of the gap. Magnetic field lines are not constrained anywhere within the gap, but tend to be most dense and of consistent strength centrally within the gap. Various means may be provided to vary the strength of the field monitored by the sensor, ranging from shunting the magnetic field around the gap to changing the dimensions of the gap.

Regardless of the arrangement and method for changing the field about the sensor, the magnetic circuit faces several obstacles which have heretofore not been overcome. Movement of the sensor relative to the gap, which is the result of axial and radial play between the rotor and stator, will lead to a variation in field strength measured by the sensor. This effect is particularly pronounced in Hall effect, magnetoresistive and other similar sensors, where the sensor is sensitive about a single axis and insensitive to perpendicular magnetic fields.

The familiar bulging of field lines jumping a gap illustrates this, where a Hall effect sensor not accurately positioned in the gap will measure the vector fraction of the field strength directly parallel to the gap. In the center of the gap, this will be equal to the full field strength. The vector fraction perpendicular thereto will be ignored by the sensor, even though the sum of the vectors is the actual field strength at that point. As the sensor is moved from the center of the gap, the field begins to diverge, or bulge, resulting in a greater fraction of the field vector being perpendicular to the gap. Since this will not be detected by the sensor, the sensor will provide a reading of insufficient magnitude.

In addition to the limitations with regard to position and field strength, another set of issues must be addressed. A position sensor of value in the transportation industry must be precise in spite of fluctuating temperatures. In order to gain useful output, a magnet must initially be completely saturated. Failure to do so will result in unpredictable performance. However, operating at complete saturation leads to another problem referred to in the trade as irreversible loss. Temperature cycling, particularly to elevated temperatures, permanently decreases the magnetic output.

A magnet also undergoes aging processes not unlike those of other materials, including oxidation and other forms of corrosion. This is commonly referred to as structural loss. Structural and irreversible loss must be understood and dealt with in order to provide a reliable device with precision output.

Another significant challenge in the design of magnetic circuits is the sensitivity of the circuit to surrounding ferromagnetic objects. For transportation applications a large amount of iron or steel may be placed in very close proximity to the sensor. The sensor must not respond to this external influence.

The prior art is illustrated, for example, by Tomczak et al in U.S. Pat. No. 4,570,118. Therein, a number of different embodiments are illustrated for forming the magnetic circuit of a Hall effect throttle position sensor. The Tomczak et al disclosure teaches the use of a sintered samarium cobalt magnet material which is either flat, arcuate, and slightly off-axis, or in second and third embodiments, rectangular with shaped pole pieces. The last embodiment is most similar to the present invention, where there are two shaped magnets of opposite polarity across an air gap of varying length.

No discussion is provided by Tomczak et al for how each magnet is magnetically coupled to the other, though from the disclosure it appears to be through the use of an air gap formed by a plastic molded carrier. Furthermore, no discussion is provided as to how this magnetic material is shaped and how the irreversible and structural losses will be managed. Sintered samarium cobalt is difficult to shape with any degree of precision, and the material is typically ground after sintering. The grinding process is difficult, expensive and imprecise. The device may be designed to be linear and precise at a given temperature and a given level of magnetic saturation, presumably fully saturated. However, such a device would not be capable of performing in a linear and precise manner, nor be reliable, through the production processes, temperature cycling and vibration realized in the transportation environment.

Furthermore, devices made with this Tomczak et al design are highly susceptible to adjacent ferromagnetic objects. The variation in adjacent ferromagnetic material from one engine to the next will serve to distort the field and adversely affect both linearity and precision. The open magnetic circuit not only adversely affects sensitivity to foreign objects, but also sensitivity to radiated energies, commonly referred to as Electro-Magnetic Interference (EMI or EMC).

The Tomczak et al embodiments are very sensitive to bearing play. The combination of an open magnetic circuit and radially narrow permanent magnet structure provides no tolerance for motion in the bearing system. This motion will be translated into a changing magnetic field, since the area within the gap in which the field is parallel and of consistent magnetic induction is very small.

Ratajski et al in U.S. Pat. No. 3,112,464 illustrate several embodiments of a brushless Hall effect potentiometer. In the first embodiment they disclose a shaped, radially magnetized structure which varies an air gap between the magnetic structure and a casing, not unlike the last embodiment of the Tomczak et al patent mentioned above. However, there is no provision for radial or axial motion of the magnet carried upon the rotor. Furthermore, the large magnetic structure is difficult to manufacture and relatively expensive.

Wu in U.S. Pat. No. 5,159,268 illustrates a shaped magnet structure similar to Ratajski et al. The structure illustrated therein suffers from the same limitations as the Ratajski et al disclosure. Additionally, the device of the Wu disclosure offers no protection from extraneous ferromagnetic objects.

Alfors in U.S. Pat. No. 5,164,668 illustrates a sensor less sensitive to radial and axial play. The disclosed device requires a large shaped magnet for precision and linearity. The size of the magnet structure places additional demand upon the bearing system. No discussion therein addresses magnet materials, methods for compensating for irreversible and structural losses, or shielding from extraneous ferromagnetic objects. The combination of large magnet, enhanced bearing structure, and added shielding combine to make a more expensive package.

SUMMARY OF THE INVENTION

The present invention overcomes the aforementioned limitations of the prior art and perceived barriers to the use of a linear type Hall effect position sensor through the use of a special geometry magnetic structure. The magnet structure includes facing magnets which extend substantially from the axis of rotation radially to beyond a pole piece. The pole piece forms a closed magnetic circuit with the magnets.

DESCRIPTION OF THE PREFERRED EMBODIMENT

Figure 1:
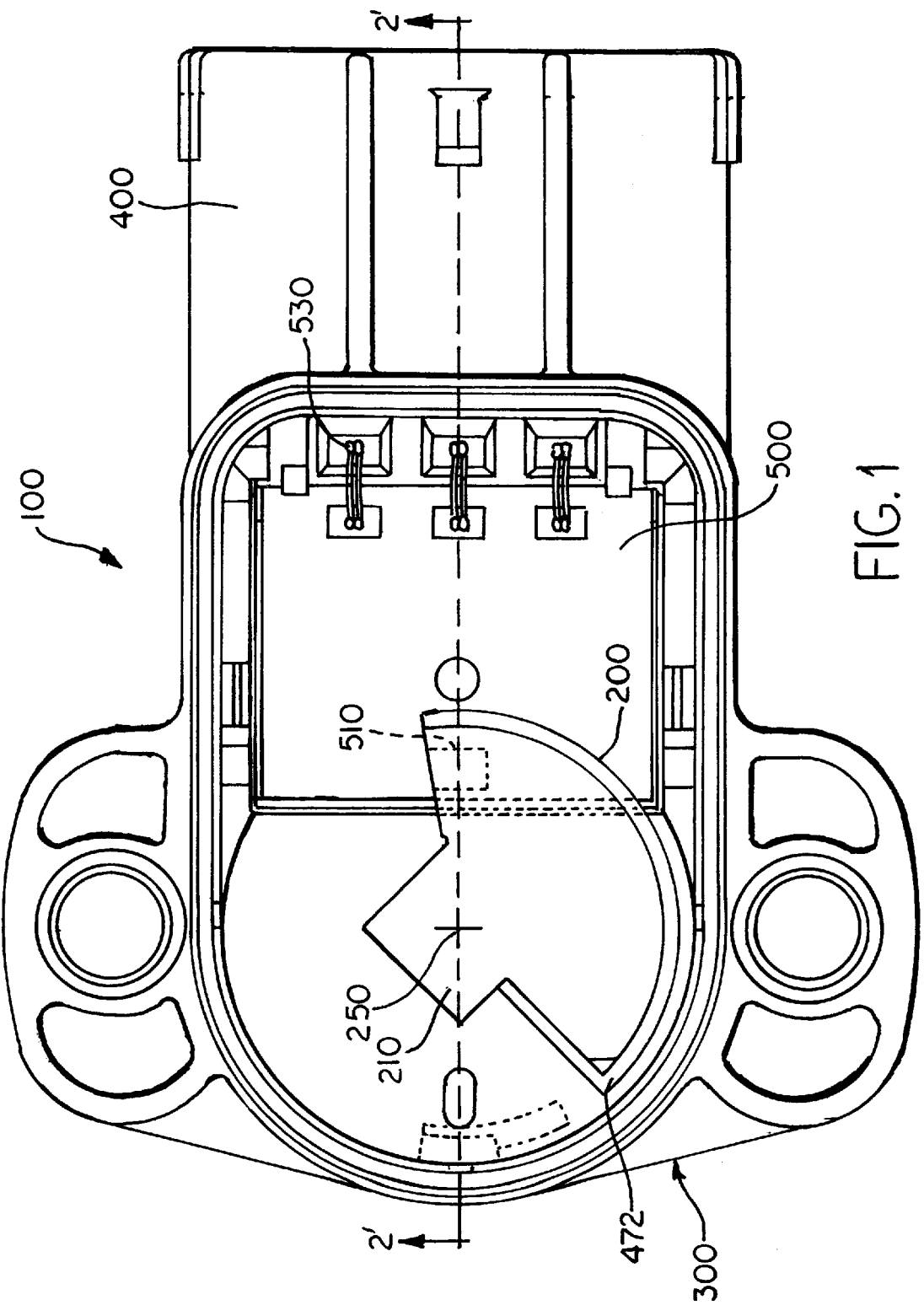
FIG. 1 illustrates the preferred embodiment of the invention from a top view with the cover removed for clarity.
Figure 2:
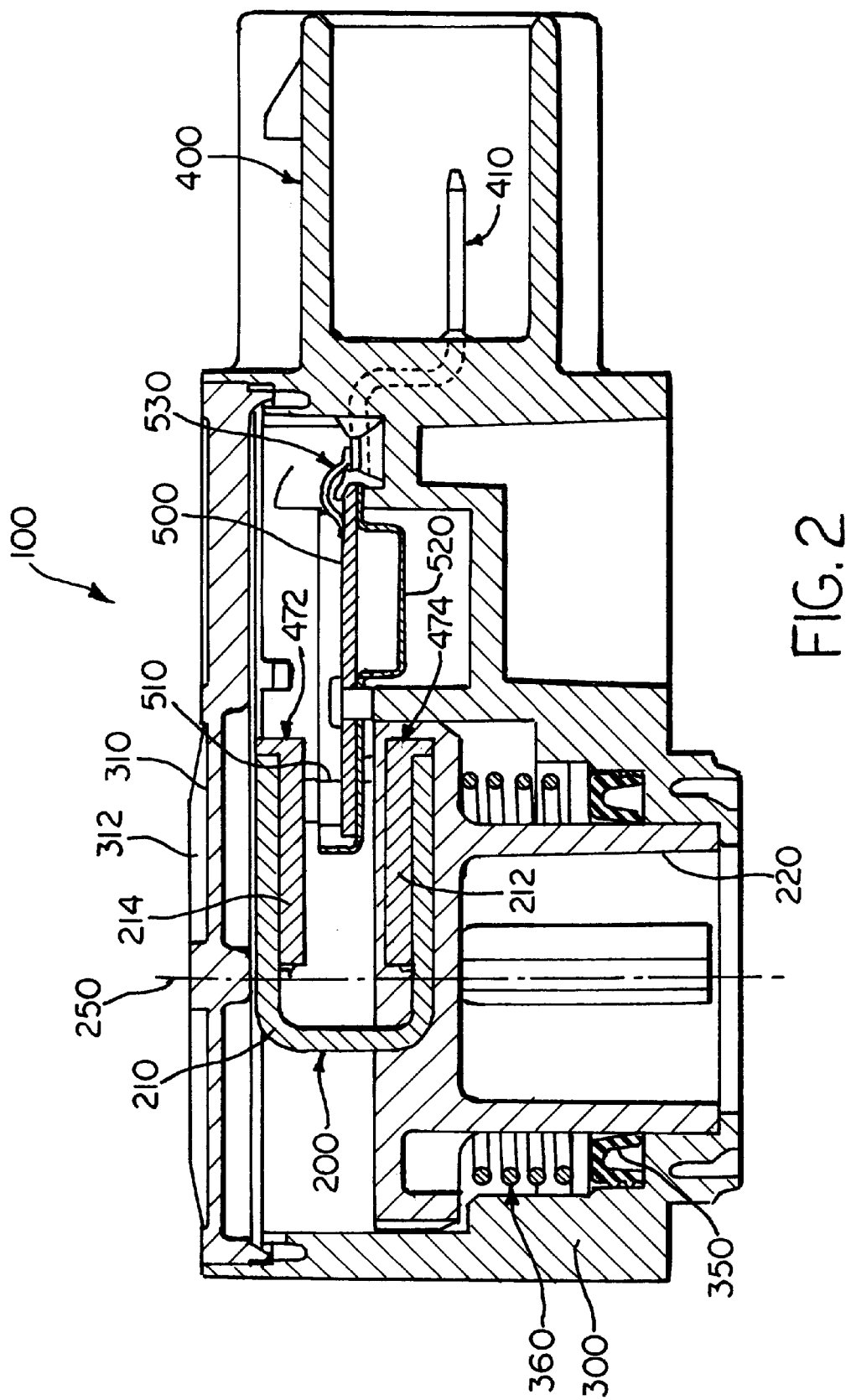
FIG. 2 illustrates the preferred embodiment of FIG. 1 from a cross-sectional view taken along line 2' of FIG. 1.
Figure 3:
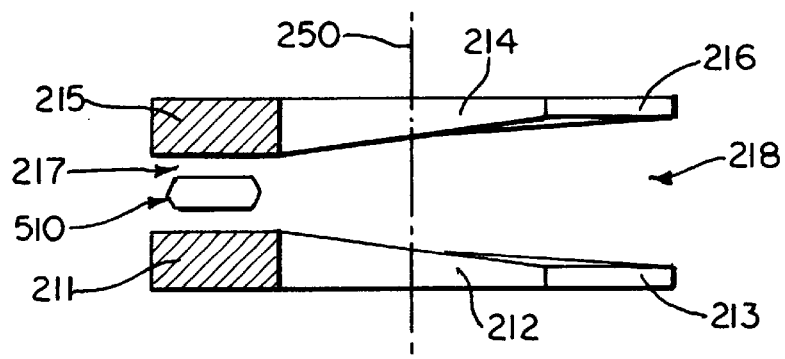
FIG. 3 illustrates a schematic view of the magnet and Hall effect device structure.

Illustrated by top view with cover removed in FIG. 1 and by cross-section in FIG. 2 is the preferred embodiment in accord with the present invention. Therein, a rotary sensor is designated generally by the numeral 100. The sensor includes a magnetic structure 200 of arcuate periphery and generally "c"-shaped cross section. Magnet structure 200 includes therein a magnetically permeable pole piece 210, shaped magnets 212 and 214, and molded rotor cup 220.

Pole piece 210 is bonded to magnets 212 and 214 such that the air gap is bordered by magnets. This use of two magnets substantially reduces loss through the air gap which otherwise occurs with only a single magnet. The closed magnetic circuit which is formed by pole piece 210 improves performance by being less sensitive to bearing play and less sensitive to external ferromagnetic objects. A closed magnetic circuit exists, for the purposes of this disclosure, when the external flux path of a permanent magnet is confined with high permeability material. Air is understood to be low permeability material. Pole piece 210 further reduces the size of magnets 212 and 214 required, and may be manufactured from molded or sintered metals. More preferably, pole piece 210 is formed from sheet steels such as ANSI 430 stainless steel.

Shaped magnets 212 and 214 are preferably formed by molding magnetic materials such as bonded ferrite. Bonded ferrite offers both a substantial cost advantage and also a significant advantage over other similar magnetic materials in structural loss due to corrosion and other environmental degradation. Other magnetic materials may be suitable, as will be determined by one skilled in the art.

Magnets 212 and 214 should extend substantially from the outer diameter of pole piece 210 to a point very close to, or, design allowing, in line with the axis of rotation 250. This large extension of magnets 212 and 214 in the radial direction greatly reduces the effects of radial motion of magnetic structure 200.

Additionally, magnets 212 and 214 are formed with lip structures 474 and 472 as illustrated best in FIG. 2. These formations extend out beyond and partially around pole piece 210. The lips 472 and 474 serve to expand the "sweet zone" of operation of the Hall effect device 510, by forcing a larger area of linear magnetic field lines passing through the air gap between magnets 212 and 214. This larger area of linear field lines directly corresponds to greater tolerance for both radial and axial play.

Molded rotor cup 220 includes a surface designed to engage with a shaft extending, for example, from a throttle body and carrying thereon the throttle butterfly. Molded rotor cup 220 then rotates about an axis identified from end view as 250 in FIG. 1 and carries therewith the remainder of magnet structure 200. Molded rotor cup 220 is retained by housing 300, seal 350, helical spring 360 and cover 310.

Cover 310 engages with housing 300 and may, for example, be ultrasonically welded in place. Cover 310 is strengthened against warpage and deflection through the formation of ribs 312.

Within the gap formed by magnets 212 and 214 is a hybrid circuit substrate 500 carrying thereon a Hall effect device 510. Hall effect device 510 should be positioned somewhere between the outer diameter or outer edge of magnets 212 and 214 and the inner diameter or inner edge near axis 250, but not particularly close to either one, so as to avoid the field bulging effect mentioned earlier. Magnets 212 and 214 have a width that is perpendicular to the axis 250. There is a void that extends along a direction of the width, is also formed perpendicular to the axis, and extends from the axis to the inner edge of the magnets. As illustrated, it should be noted that the void is substantially smaller than the width of the magnets. This void and width relative size relationship obviously allow for a larger area of linear magnetic field lines to pass through the air gap between magnets 212 and 214.

Hybrid substrate 500 may be attached by heat staking or other similar method to the housing 300. Hybrid substrate 500 additionally carries thereon electrical circuitry within tray 520. This tray 520 acts as a container into which appropriate potting compounds may be placed to provide all necessary environmental protection to the associated circuitry. Tray 520 should be electrically grounded for protection against radiated fields (EMI and EMC).

Hybrid substrate 500 is electrically interconnected to electrical terminals 410 through wire bonds 530, though it is well understood that any of a large number of electrical interconnection techniques would be suitable. Electrical connector terminals 410 emerge from housing 300 at a connector body 400, for interconnection to standard mating connectors.

Magnetic structure 200 rotates about a generally center axis 250 relative to housing 300, thereby rotating magnets 212 and 214 together with pole piece 210. Hall effect device 510 is retained relative to the housing 300. Best illustrated in FIG. 3, there is a three-dimensional schematic representation of the preferred embodiment. Uniquely, magnets 212 and 214 are shaped generally helically so as to have a relatively thicker end and a relatively thinner end. The thicker and thinner ends and the portion therebetween the two ends illustrate a thickness that varies in a direction that is parallel to axis 250. One skilled in the art realizes that this variable thickness creates variation in the flux density and thereby causes signal changes in the hall effect device 510 that indicate the given positional point along a rotation of the magnets. At the thicker ends 211 and 215, which is at the same angle of rotation of magnetic structure 200 for both magnets 212 and 214, there is a smaller air gap 217. At the thinner ends 213 and 216, there is a correspondingly larger air gap 218. The result is the generation of less magnetic induction across gap 218, with more magnetic induction across gap 217. It is noted that the shape of magnets 212 and 214 create opposing top surfaces that are substantially larger than side surfaces of the magnets as illustrated in FIGS. 2 through 6. The larger top surfaces obviously allow for a larger area of linear magnetic field lines to pass through the air gap between magnets 212 and 214.

Rotation of pole piece 210 about axis 250 results in changing field magnetic induction which is directly measured by Hall effect device 510. Proper shaping of the gap will produce a linear output from Hall effect device 510. However, such a system will not perform linearly and with precision and resistance to bearing play over life without further design considerations.

In order to stabilize a magnet against irreversible losses, it is necessary first to saturate magnets 212 and 214 and then to demagnetize the magnets by a small amount. The magnetic structure 200 does not demagnetize evenly from magnet ends 211 and 215 to magnet ends 213 and 216, without special consideration. Absent the appropriate demagnetization, described in our copending application filed Nov. 24, 1997, Ser. No. 08/971,800, titled Field Strength Position Sensor with Improved Bearing Tolerance in a Reduced Space and incorporated herein by reference, the resulting device will either lose precision as a result of temperature excursions or will lose linearity as a result of stabilizing demagnetization.

Figure 4:
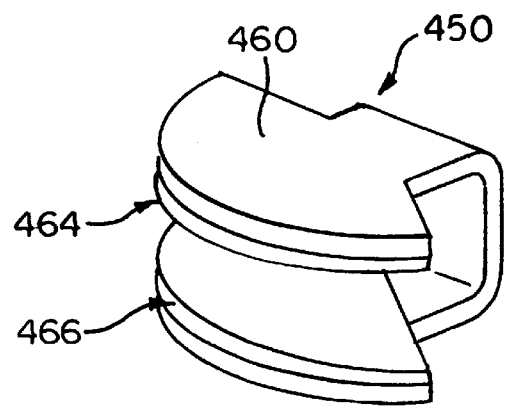
FIG. 4 illustrates an alternative magnetic structure from a projected view.
Figure 5:
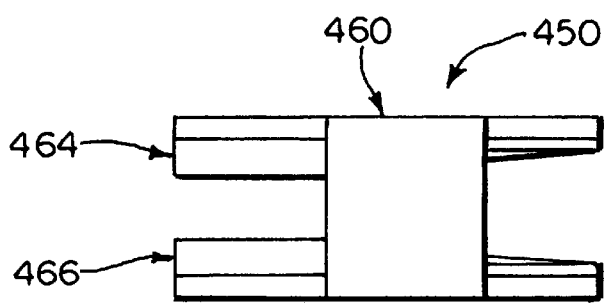
FIG. 5 illustrates the embodiment of FIG. 4 from an end view.
Figure 6:
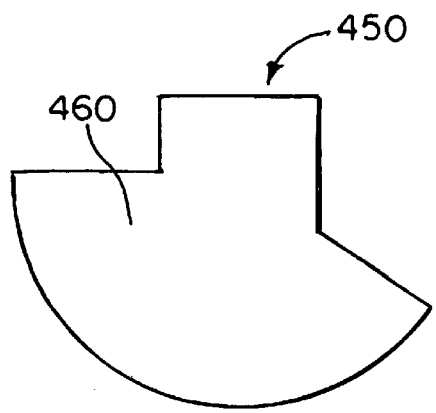
FIG. 6 illustrates the embodiment of FIG. 4 from a top view.

FIGS. 4, 5 and 6 illustrate an alternative embodiment to magnet structure 200, with rotor cup 220 removed for clarity. Therein, magnet structure 450 includes a magnetically permeable pole piece 460 and two shaped magnets 464 and 466. Magnets 464 and 466 do not have the lips of the preferred embodiment. In every other way, this structure is designed to be a functional equivalent, with a slightly reduced "sweet zone" of operation. The magnets 464 and 466 are still tapered so as to provide a changing magnetic induction with rotation.

Figure 7:
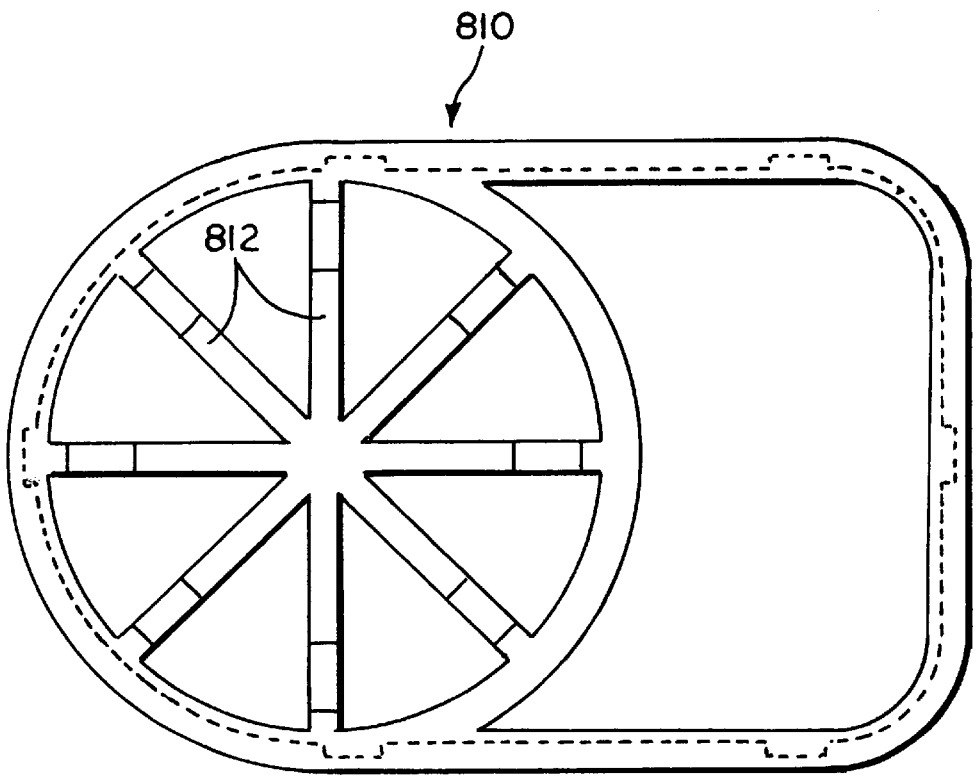
FIG. 7 illustrates a top view of an alternative embodiment cover.
Figure 8:
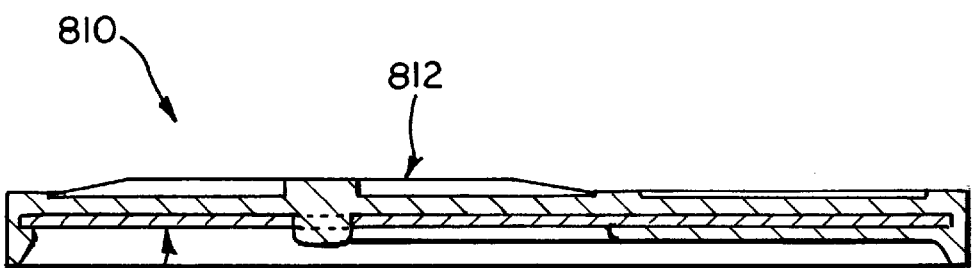
FIG. 8 illustrates a cross-section view of the cover of FIG. 7.

FIGS. 7 and 8 illustrate an alternative embodiment of cover 310, wherein a ferromagnetic plate 814 is shown molded into cover 810. Cover 810 includes reinforcing ribs 812 similar to ribs 312. The use of a ferromagnetic plate further reduces the sensitivity of position sensor 100 to external ferromagnetic objects, for those applications requiring extreme precision. For EMC and EMI considerations, plate 814 should be grounded.

The apparatus for measuring angular or rotary position described herein as preferred is a low cost structure due to the minimal weight and reduced demands upon magnetic components. In addition, there are many performance advantages not heretofore obtainable, including reduced sensitivity to bearing play, resistance to contamination and environment, reduced sensitivity to externally located fields, energies and objects, durability for both full stroke motion and dithers, precision, linearity, reduced complexity, and reduced cost.

While the foregoing details what is felt to be the preferred embodiment of the invention, no material limitations to the scope of the claimed invention is intended. Further, features and design alternatives that would be obvious to one of ordinary skill in the art are considered to be incorporated herein. The scope of the invention is set forth and particularly described in the claims hereinbelow.

We claim:

1. A sensor for sensing rotational positions of a device that rotates, comprising:
   a) an axis that a portion of the sensor rotates about when coupled to the device;
   b) the portion including, a first magnet, attached to the device, and having: 1) a variable thickness that is parallel to the axis, 2) a width that is substantially perpendicular to the axis of rotation, having a portion of an inner edge that substantially abuts the axis of rotation, and 3) an outer radial edge that substantially extends outward from the inner edge; and
   c) a detector, positioned next to the first magnet, in proximity to the variable thickness and between the inner edge and the outer radial edge, to sense changes in flux density created by rotation of the first magnet about the axis of rotation.

2. The sensor according to claim 1, wherein the portion further comprises:
   a second magnet, attached to the device and, physically identical to the first magnet, and positioned substantially as a mirror image of the first magnet.

3. The sensor according to claim 2, wherein the sensor is positioned between the first and second magnets.

4. The sensor according to claim 2, wherein the first and second magnets have a first portion that is thicker than a second portion as viewed along a radius extending about the axis of rotation.

5. The sensor according to claim 4, further comprising:
   a pole piece means, being magnetically permeable and non-magnetized, for maintaining the first and second magnets in their 1) respective parallel alignment to each other, and 2) respective perpendicular alignment to the axis of rotation.

6. The sensor according to claim 5, wherein the pole piece means is substantially C-shaped with a first and second arm perpendicular to the axis of rotation that are for supporting the first and second magnets respectively.

7. The sensor according to claim 6, wherein the pole piece means has a connecting piece that ridgedly connects the first and second arms.

8. The sensor according to claim 7, wherein the connecting piece is non-coextensive with the axis of rotation.

9. The sensor according to claim 8, wherein the sensor is a Hall effect sensor.

10. A sensor for sensing rotational positions of a device that rotates, comprising:
    a) an axis that a portion of the sensor rotates about when coupled to the device;
    b) the portion including, a first magnet, attached to the device and having: 1) a variable thickness that is parallel to the axis, 2) a side surface that is parallel to the axis, and 3) a top surface that is both perpendicular to the axis of rotation, and is substantially larger than the side surface;
    c) the portion further including, a second magnet, attached to the device and having: 1) a variable thickness that is parallel to the axis, 2) a side surface that is parallel to the axis, and 3) a top surface that is both perpendicular to the axis of rotation, and is substantially larger than the side surface, wherein the first and second magnet top surfaces oppose each other, the first and second magnets have a first portion that is thicker than a second portion as viewed along a radius extending about the axis of rotation;
    d) a detector, positioned between the first and second magnets, in proximity to the variable thickness and between the inner edge and the outer radial edge so as to detect changes in flux density created by rotation of the first and second magnets about the axis; and
    e) a pole piece means, being magnetically permeable and non-magnetized, for maintaining the first and second magnets in their 1) respective parallel alignment to each other, and 2) respective perpendicular alignment to the axis of rotation.

11. The sensor according to claim 10, wherein the pole piece means is substantially C-shaped with a first and second arm perpendicular to the axis of rotation that are for supporting the first and second magnets respectively.

12. The sensor according to claim 11, wherein the pole piece means has a connecting piece that rigidly connects the first and second arms.

13. The sensor according to claim 12, wherein the connecting piece is non-coextensive with the axis of rotation.

14. The sensor according to claim 13, wherein the detector is a Hall effect sensor.

15. A sensor for sensing rotational positions of a device that rotates, comprising:
    a) an axis that a portion of the sensor rotates about when coupled to the device;
    b) the portion including, a first magnet, attached to the device, and positioned substantially perpendicular to the axis, having: 1) a variable thickness parallel to the axis, 2) a magnet width that is perpendicular to the axis, and 3) a void that is oriented perpendicular to the axis and extends from the axis to an inner edge of the first magnet, wherein the void is substantially smaller than the width;
    c) the portion further including, a variably thick second magnet, attached to the device and positioned substantially perpendicular to the axis and parallel to the first magnet, and shaped substantially identical to the first magnet, the first and second magnets have a first portion that is thicker than a second portion as viewed along a radius extending about the axis of rotation;
    d) a detector, positioned between the first and second magnets, in proximity to the variable thickness and between the inner edge and the outer radial edge so as to sense changes in flux density created by rotation of the first and second magnets about the axis of rotation; and e) a pole piece means, being magnetically permeable and non-magnetized, for maintaining the first and second magnets in their 1) respective parallel alignment to each other, and 2) respective perpendicular alignment to the axis of rotation.

16. The sensor according to claim 15, wherein the pole piece means is substantially C-shaped with a first and second arm perpendicular to the axis of rotation that are for supporting the first and second magnets respectively.

17. The sensor according to claim 16, wherein the pole piece means has a connecting piece that rigidly connects the first and second arms.

18. The sensor according to claim 17, wherein the connecting piece is non-coextensive with the axis of rotation.

19. The sensor according to claim 18, wherein the detector is a Hall effect sensor.

* * * * *